United States Patent [19]

Swozil

[11] Patent Number: 4,474,233
[45] Date of Patent: Oct. 2, 1984

[54] TUBE BUNDLE HEAT EXCHANGER

[75] Inventor: Adolf Swozil, Kühlenthal, Fed. Rep. of Germany

[73] Assignee: Sigri Elektrographit GmbH, Meitingen, Fed. Rep. of Germany

[21] Appl. No.: 366,648

[22] Filed: Apr. 8, 1982

[30] Foreign Application Priority Data

Apr. 24, 1981 [DE] Fed. Rep. of Germany ....... 3116309

[51] Int. Cl.³ ............................................. F28F 1/36
[52] U.S. Cl. ................................. 165/184; 138/141; 138/144; 138/153; 138/172; 165/DIG. 9
[58] Field of Search ................... 165/109 R, 158, 184, 165/DIG. 8, DIG. 9; 138/144, 172, 153, 141

[56] References Cited

U.S. PATENT DOCUMENTS

| | | | |
|---|---|---|---|
| 2,782,806 | 2/1957 | Stambaugh et al. | 138/109 |
| 2,807,282 | 9/1957 | Watts et al. | 138/141 |
| 4,118,262 | 10/1978 | Abbott | 138/172 X |
| 4,134,451 | 1/1979 | Conant et al. | 165/DIG. 8 |
| 4,244,423 | 1/1981 | Thut et al. | 165/158 X |
| 4,253,519 | 3/1981 | Kun et al. | 165/184 X |

Primary Examiner—Sheldon J. Richter
Attorney, Agent, or Firm—Herbert L. Lerner; Laurence A. Greenberg

[57] ABSTRACT

Tube bundle heat exchanger of graphite, in which a multiplicity of graphite tubes are set into the tube sheets and are joined to the sheets by screw or cement joints, characterized by the feature that each tube is surrounded by at least one group of graphite fiber bundles, the latter are connected to the tube in a force-locking manner, and the distance of adjacent fiber bundles is five to ten times the diameter of the graphite fiber bundle.

2 Claims, 3 Drawing Figures

TUBE BUNDLE HEAT EXCHANGER

BACKGROUND OF THE INVENTION

1. Field of the Invention

The invention relates to a tube bundle heat exchanger of graphite in which a multiplicity of graphite tubes is set in tube sheets and is connected to the sheets by screw or cement connections.

2. Description of the Prior Art

Graphite, under which term carbon and carbon-graphite mixtures will also be included in the following, is relatively resistant to high temperatures and aggressive substances and exhibits practically metallic conductivity properties and accordingly is often used, also as a structural part, under conditions which metallic and ceramic materials can generally not stand. Due to their manufacture, graphite parts are porous and, if a reduction of their permeability is necessary, are impregnated with a synthetic resin or other means determined by the conditions of the application. Impregnated graphites are practically impenetrable for fluids and it is known to use these graphites, for instance, in the form of tubes in tube bundle heat exchangers.

A frequently less satisfactory property of the graphite material is its relatively low strength, particularly in the presence of shock-like and undulating stresses. Fiber-like graphites have been known for some time which do not have this disadvantage and belong among the materials with the greatest strength. Graphite fibers are preferably used for reinforcing hardenable synthetic resins and are coated for this purpose with a synthetic resin solution and are laid out or wound in this form to form planar structures. The resins are hardened by a special heat treatment and optionally, pyrolized by heating the blanks to a higher temperature. In the latter case, a carbon body reinforced by carbon fibers is obtained which has great strength and a very advantageous thermal resistance. The fiber content of these bodies is generally more than 50%. It is likewise known to process carbon fibers in the form of fabrics, tapes or the like and to orient them in accordance with the expected mechanical stresses of the finished bodies. Carbon fiber-reinforced carbon bodies are very expensive because of the high cost of the graphite fibers and the relatively elaborate production process, so that the use of this material has been limited to areas in which, as in aeronautics, weight savings are an important advantage.

It is known, German Pat. No. 19 33 369, to coat structural parts such as sheet metal pieces or tubes with a resin composition containing graphite fibers cut to a short length to improve the corrosion resistance. The coated parts have adequate corrosion resistance under certain conditions, but this solution to the problems is not always satisfactory because of the limited thermal stability. In addition, the thermal resistance is increased by the coating, so that only a low effectivity is obtained as compared to a graphite tube, if they are used as the heat exchanging element.

It is known from British Patent Application No. 2 069,342, U.S. Pat. No. 3,840,230 and other patents to cement layers of carbon fabric on frames of tennis rackets and other sport equipment and to thereby improve the strength and stiffness of a core which is surrounded by the reinforcing layers. U.S. Pat. No. 2,782,806, discloses a carbon tube which is impregnated with a synthetic resin and is connected to a flange, and to which a sleeve of fiber glass fabric is cemented in the region of the joint. The joint is impermeable to fluids and has great mechanical strength.

SUMMARY OF THE INVENTION

An object of the invention is to improve the strength and particularly the dynamic strength of graphite tubes forming parts of a tube bundle heat exchanger over their entire length, without adversely affecting materially the thermal resistance or the heat exchange.

With the foregoing and other objects in view, there is provided in accordance with the invention a tube bundle heat exchanger of graphite, comprising a multiplicity of graphite tubes set into tube sheets and joined to the sheets by screw or cement joints, with each tube surrounded by at least one group of graphite fiber bundles which are connected to the tube in a force-locking manner, and with adjacent fiber bundles of the group spaced a distance five to ten times the diameter of the graphite fiber bundle.

Other features which are considered as characteristic for the invention are set forth in the appended claims.

Although the invention is illustrated and described herein as embodied in a tube bundle heat exchanger, it is nevertheless not intended to be limited to the details shown, since various modifications may be made therein without departing from the spirit of the invention and within the scope and range of equivalents of the claims.

Figure 1:
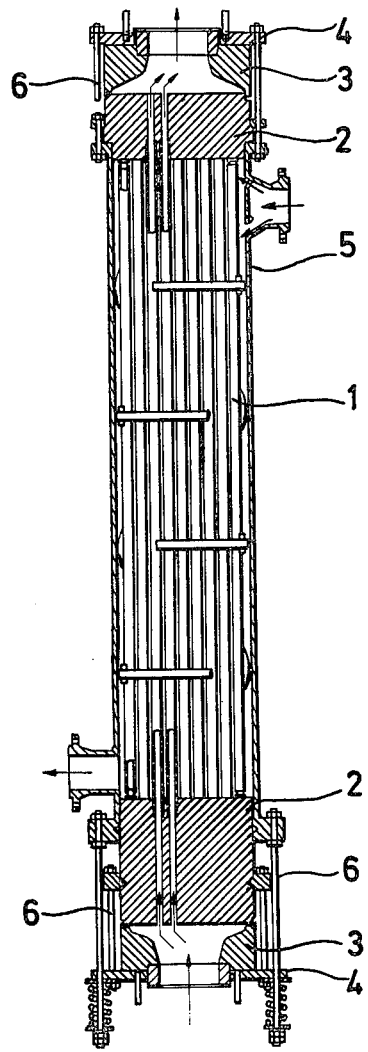
FIG. 1 is a sectional view of the tube bundle heat exchanger of graphite in which graphite tubes 1 are assembled in tube sheets 2. Headers 3 and clamping plates 4 are connected by tie rod rods 6. The tube bundle is surrounded by the steel shell 5.
Figure 2:
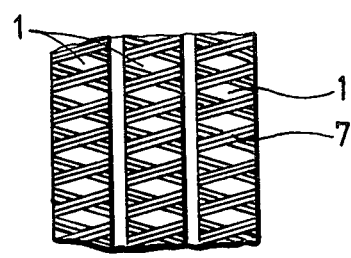
FIG. 2 shows a section of the tube bundle indicated by a circle in FIG. 1, with two groups of graphite fiber bundles 7 surrounding the graphite tubes 1.
Figure 3:
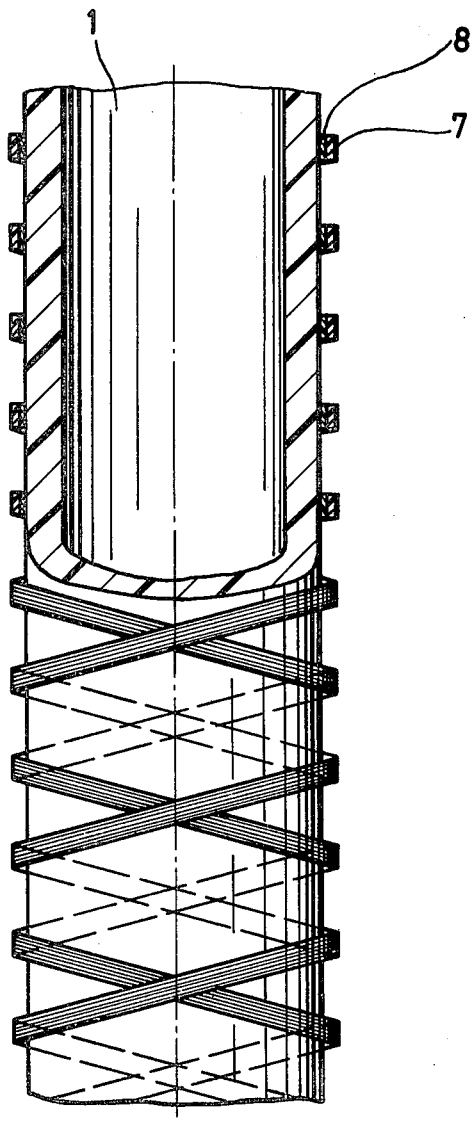
FIG. 3 shows a single graphite tube 1 surrounded by graphite fiber bundles 7 which are connected to the tube by resin bridges 8. The bundles are slightly flattened by winding on the tubes.

The construction and method of operation of the invention, however, together with additional objects and advantages thereof will be best understood from the following description.

DETAILED DESCRIPTION OF THE INVENTION

In accordance with the invention each tube is surrounded by at least one group of graphite fiber bundles. The latter are connected to the tube in a force-locking manner, and the distance between adjacent fiber bundles is five to ten times the diameter of the graphite fiber bundle.

The invention is based on the insight that the strength of graphite tubes can be increased by surrounding the tubes with graphite fiber bundles. The reinforcing effect can be adapted in a simple manner by the quantity of fibers and the orientation of the fiber bundles relative to the stress direction according to the conditions present, so that even if fibers are used sparingly, a technically satisfactory solution is obtained, and a sufficiently large area for unimpeded heat exchange is provided between the bundles.

Preferred are several groups of fiber bundles which are inclined at an angle with respect to each other and form a network surrounding the graphite tube. The fiber bundles are inclined, for instance, ±80° relative to the longitudinal axis of the tube. According to another embodiment, the fiber bundles have a pretension i.e. prestress generated in the winding process, in order to suppress tensile stresses which are particularly disadvantageous for graphite, at least in part.

The ratio of the distance of adjacent fiber bundles to the bundle diameter is a function of the mechanical stress of the tube and is preferably 5:1 to 10:1. Accordingly, there follow in each direction inclined toward the longitudinal extent of the fiber bundles, alternating, relatively thin fiber strips and relatively wide uncovered strips of the tube surface, so that the thermal resistance of the tubes which is proportional to the ratio, is not changed significantly. For instance, the exchange output of such tube bundle exchangers containing such tubes is only slightly different from the tubes not reinforced. Because of the great strength increase of the surrounded tubes it is furthermore possible to compensate the small loss, if necessary, without appreciable loss of strength by a reduction of the tube wall thickness. The force-locking connection between the tube and the fiber bundles consist of thin bridges of hardened resin which has chemical and thermal resistance corresponding to the application. Particularly suitable are the well-known copolymerisates, designated as acrylic resins, of acrylic and methacrylic acid with, for instance, butadiene, styrene, etc.

For fabricating the tubes according to the invention, graphite fiber bundles are immersed in resin or resin solutions and then wound on the graphite tube. The spacing of adjacent bundles and their orientation are adjusted so that the necessary strength is obtained with a covering of the tube surface as small as possible. If planar material is used, it is advantageous to select the type of fabric according to the same principles. Pretensions can be generated in known manner by applying the fiber bundles under tensile stress. For securing the fiber bundles in a force-locked manner, the tube is heated to about 120° to 180° C., for instance, by exposing the tubes to hot air during the winding, in the process of which the resin sets and forms solid force-transmitting bridges. For making the bridges, resins other than the acrylic resins described above can also be used in known manner; for instance epoxy, polyester or phenolformaldehyde resins. A pretensioning effect is automatically obtained when the tubes are heated, due to the very small elongation of the fiber bundles and the substantially greater expansion of the tubes perpendicularly to the tube axis.

The invention will be explained in the following by way of an example: Graphite fiber bundles of about 6,000 filaments were wound crosswise on graphite tubes with an outside diameter of 50 mm and inside diameter of 37 mm. The filament diameter was about 8 $\mu$m and the tensile strength of the bundle was about 3,000 $N/mm^2$. The fiber bundles had previously been drawn through a bath of styrene-modified acrylic resin and had a thin resin layer on the surface. The resin was hardened by heating the wound tube to 120° C. About 20% of the tube surface was occupied by fibers which were inclined at an angle of ±84° to the longitudinal axis of the tube and their mutual distance was about 10 mm.

In the first experiment, these and unreinforced graphite tubes were subjected to pressure up to rupture. The rupture pressures were 105 and 75 bar, respectively. Unreinforced graphite tubes became leaky after this experiment at any pressure, whereas the tubes according to the invention showed no leaks up to a pressure of about 8 bar and behaved like undamaged tubes.

The "healing" of leaks is particularly valuable for tubes used in tube bundle heat exchangers which are subjected to unavoidable pressure shocks and the operational pressure of which is less than 8 bar. Tubes for tube bundle heat exchangers are advantageously surrounded up to the ends of the tubes, so that the fiber bundles are secured in the tube sheet by cementing the tubes in.

In a second experiment, the change of the thermal conductivity for a predetermined heat output was determined. The relative conductivity referred to the conventional graphite tubes was 0.96 for the tubes according to the invention and 0.64 for graphite tubes which had a continuous thin resin film containing about 60 volume % graphite fibers on the outside surface.

I claim:

1. Tube bundle heat exchanger of graphite, comprising a multiplicity of graphite tubes set into tube sheets and joined to the sheets by screw or cement joints, with each tube surrounded by at least one group of graphite fiber bundles, which are connected to the tube in a force-locking manner and with adjacent fiber bundles of the group spaced a distance five to ten times the diameter of the graphite fiber bundle, wherein the fiber bundles are prestressed.

2. Tube bundle heat exchanger according to claim 1, wherein the force-locking connection between the fiber bundles and the tube consists of acrylic resin bridges.

* * * * *